No. 702,911.     O. BARRELLE.     Patented June 24, 1902.
WEEDING HOE.
(Application filed Sept. 30, 1901.)
(No Model.)
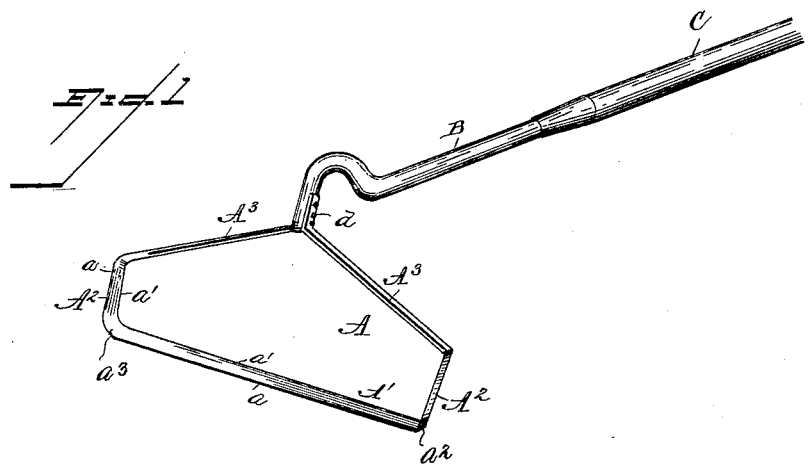
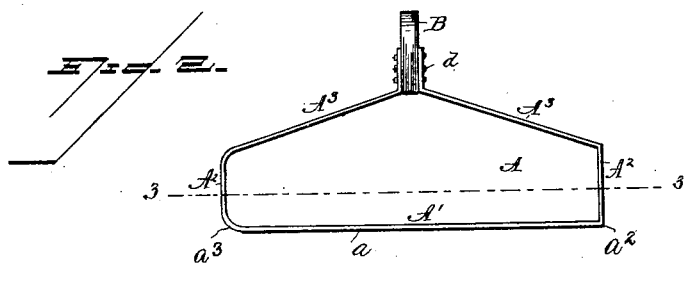
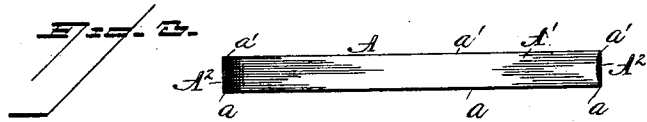
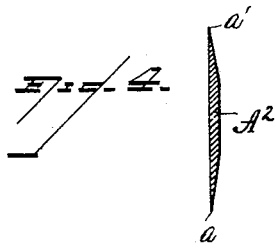
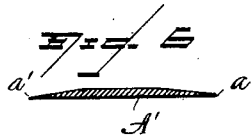
Witnesses
Frank S. Maguire
R. J. O'Beall
Orlando Barrelle,
Inventor
by John B. Thomas & Co.,
Attorneys
THE NORRIS PETERS CO., PHOTO-LITHO., WASHINGTON, D. C.

UNITED STATES PATENT OFFICE.

ORLANDO BARRELLE, OF SOUTH HARTFORD, NEW YORK, ASSIGNOR OF ONE-HALF TO ALMOND BARRELLE, OF MEMPHIS, TENNESSEE.

WEEDING-HOE.

SPECIFICATION forming part of Letters Patent No. 702,911, dated June 24, 1902.

Application filed September 30, 1901. Serial No. 77,097. (No model.)

*To all whom it may concern:*

Be it known that I, ORLANDO BARRELLE, a citizen of the United States, and a resident of South Hartford, in the county of Washington and State of New York, have invented certain new and useful Improvements in Weeding-Hoes, of which the following is a specification.

The object of this invention is to provide a weeding-hoe which is especially adapted for the purpose of cultivating vegetables, the blade of the implement being sharpened at both edges and is of peculiar shape, so that in the operation of the hoe the said blade may work back and forth and remain at all times below the surface of the ground, whereby the cultivation of a garden may be more quickly and thoroughly accomplished and whereby the weeds which are destroyed by cutting their roots are left upon the surface of the ground to shade the weed-seeds and prevent the germination of the same.

With the above primary objects in view the invention consists principally in the peculiar construction and arrangement of the blade, comprising a straight portion adapted in use to work below the surface of the ground and on a plane therewith and vertical end members for the purpose of weeding close to the growing plants, the entire blade, including the straight portion and end members, being sharpened at both edges, so that the said blade will cut when moved in either direction, together with the means for attaching the blade to the handle of the implement.

The following specification enters into a detail description of the construction and operation of my improved weeding-hoe, reference being had to the accompanying drawings and to letters of reference thereon, which designate the different parts, and what I claim as my invention is more specifically set forth in the appended claim.

In the drawings, Figure 1 is a perspective view of a weeding-hoe constructed in accordance with my invention. Fig. 2 is a front elevation. Fig. 3 is a sectional view on the line 3 3, Fig. 2. Figs. 4, 5, and 6 are transverse sectional views through the several parts of the blade.

Referring now to said drawings, A designates the cutting-blade, which consists of the straight portion $A'$ and vertical members $A^2 A^2$, the latter extending upwardly from the ends of the said straight portion. Formed integral with the upper ends of the vertical members $A^2$ of the cutting-blade are arms $A^3 A^3$, which extend toward each other and are bent upwardly at their inner ends for attachment to the shank B, the latter being secured in the end of the handle C. The cutting-blade and its supporting-arms are composed of a single strip of steel bent to form the straight blade $A'$ and end members $A^2$, and in forming these parts which comprise the hoe proper one of the end blades is connected by abrupt angles $a^2$, while the corners at the other end of the hoe are rounded, as shown at $a^3$. The metal strip is of hardened steel, and both edges of the parts $A' A^2 A^2$ are sharpened, providing the cutting edges $a$ and $a'$.

The bent ends of the supporting-arms $A^3$ are connected to the shank B by means of bolts and nuts $d$, and in adjusting the parts the handle should be disposed at an upward angle when the straight portion of the cutting-blade is flat.

In the operation of the hoe it is intended that the straight portion of the cutting-blade shall enter the ground to a certain depth and be moved back and forth below the surface to sever the roots of the weeds and not disturb the upper or top soil to any great extent, leaving it mellow and light. The weeds, being cut at the roots, drop upon the ground and by shading the weed-seeds prevent germination of same. The vertical members of the blades provide for cutting weeds and cultivating the soil close up to the growing plants and also indicate the width of cut and permit the operator to avoid the roots of the plants. The flat blade cuts easily in either direction and removes no soil. The particular construction of the device prevents it from clogging, so that the operator is not required to lift the blade from the ground to clean it. By having the curved corners $a^3$ at one end of the hoe the said hoe can be worked close up to the growing plants, and by turning the hoe on end the ground can be cultivated between plants without disturbing the roots.

Having thus described my invention, I claim—

A weeding-hoe comprising a cutting-blade having a straight portion A' and vertical members $A^2$ $A^2$ at the ends thereof, the vertical member at one end being connected by abrupt angles and the vertical member at the other end curved as shown, the parts A' $A^2$ $A^2$ being sharpened at both edges, arms projecting inward from the upper ends of the vertical members, and a handle to which the arms are connected, as herein shown and described.

In testimony whereof I affix my signature in the presence of two witnesses.

ORLANDO BARRELLE.

Witnesses:
C. W. INGALLS,
DANIEL R. WILES.